United States Patent [19]

Shank et al.

[11] Patent Number: 4,770,488

[45] Date of Patent: Sep. 13, 1988

[54] FIBER OPTICAL CONNECTOR WITH LENS

[75] Inventors: Jeffrey B. Shank; Steven E. Swanson, both of Williamsport, Pa.

[73] Assignee: GTE Service Corporation, Stamford, Conn.

[21] Appl. No.: 810,159

[22] Filed: Dec. 18, 1985

[51] Int. Cl.⁴ .............................................. G02B 6/36
[52] U.S. Cl. ................................ 350/96.20; 350/96.18
[58] Field of Search ............... 350/96.18, 96.20, 96.21, 350/96.22

[56] References Cited

U.S. PATENT DOCUMENTS

| | | | |
|---|---|---|---|
| 4,190,316 | 2/1980 | Malsby et al. | 350/96.18 |
| 4,269,648 | 5/1981 | Dakss et al. | 350/96.18 X |
| 4,421,383 | 12/1983 | Carlsen | 350/96.21 |
| 4,531,810 | 7/1985 | Carlsen | 350/96.20 |
| 4,639,076 | 1/1987 | Mikolaicyk et al. | 350/96.20 |
| 4,690,487 | 9/1987 | Hale et al. | 350/96.21 |
| 4,691,985 | 9/1987 | Shank et al. | 350/96.18 |

Primary Examiner—John D. Lee
Attorney, Agent, or Firm—William H. McNeill

[57] ABSTRACT

An optical fiber-lens connector assembly maintains a critical fiber-to-lens interface during temperature excursions over the range of −40° C. to +60° C. by employing a spring loaded bushing mounted within a connector body. The fiber is fixed to the bushing and the spring acting on the bushing keeps the fiber accurately located with respect to the lens when the lens body grows and shrinks with the temperature changes.

3 Claims, 2 Drawing Sheets

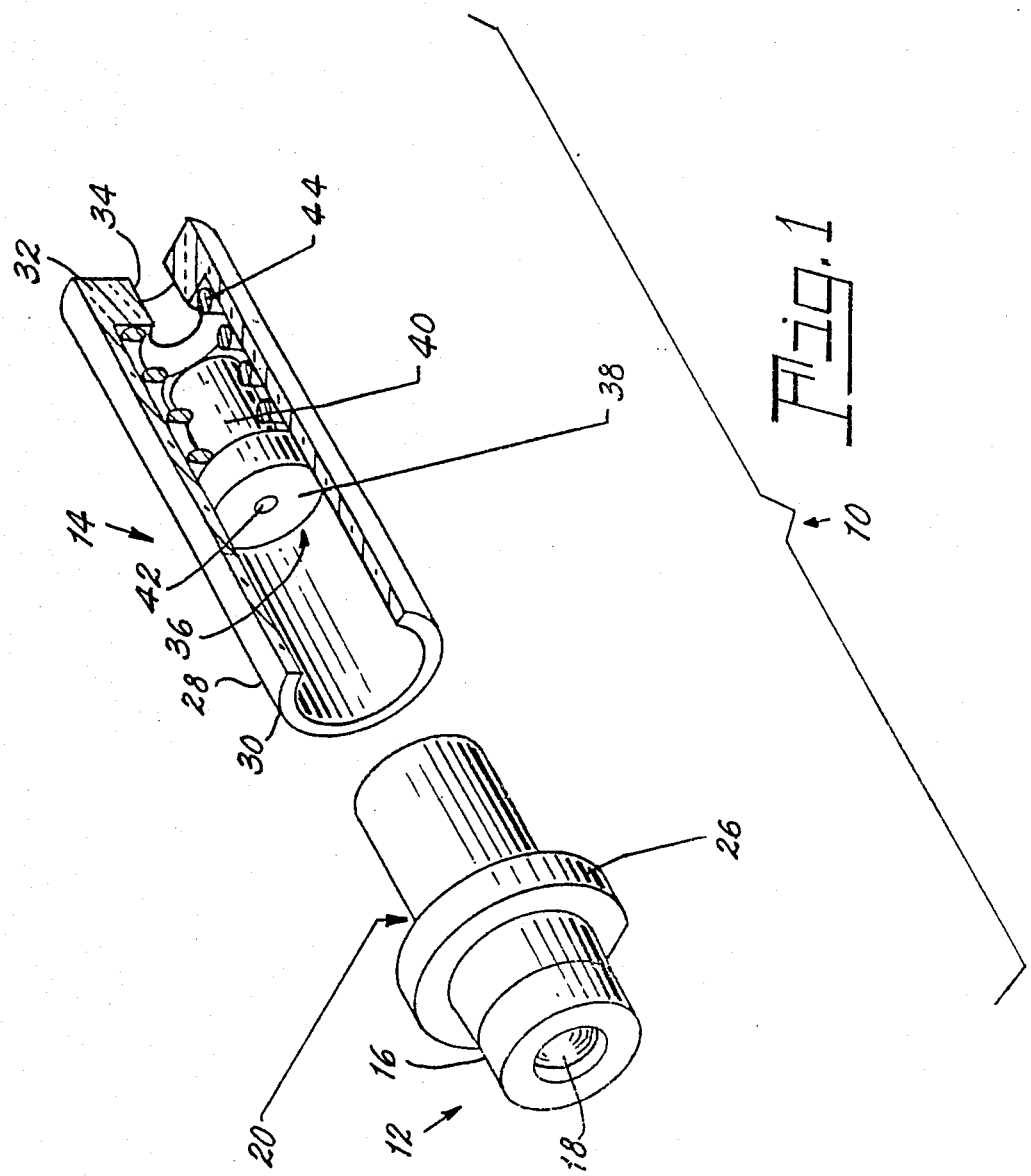

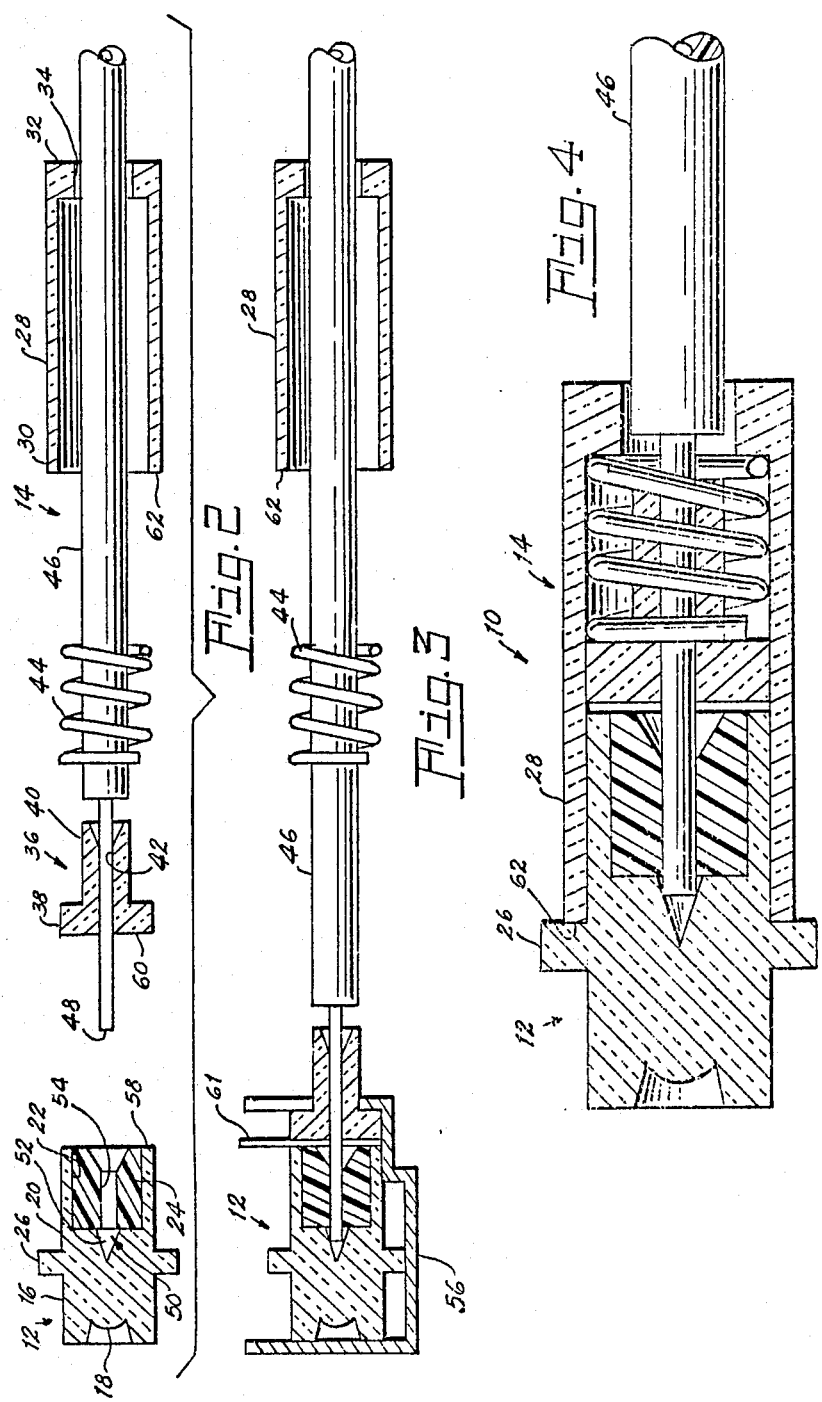

FIBER OPTICAL CONNECTOR WITH LENS

TECHNICAL FIELD

This invention relates to connectors for optical fibers and more particularly to connectors for joining an optical fiber to an expanded beam lens.

BACKGROUND ART

Optical fibers are finding increasing use in telecommunications as well as other data transmission systems because of their ability to carry vastly move information than equivalent sizes of electrical wire. Connecting two or more optical fibers, however, requires much more care than equivalent electrical connections since the fibers must be optically aligned. Many forms of optical connectors have been proposed to achieve the desired compatability of such connections; and include butt-to-butt joints of cleaved and polished fibers; and expanded beam lenses.

This invention is particularly concerned with improving the latter. Such expanded beam lens connectors are shown in U.S. Pat. No. 4,421,383. Connectors made in accordance with this patent have greatly advanced the art and function well within a temperature range of about 15° C. to 30° C. However, thermal cycling at temperature extremes, say, −40° C. to +60° C., has been shown to cause acrylic growth which creates a shift of position within the fiber-to-lens interface. This shift causes increased attenuation and, occasionally, complete failure.

DISCLOSURE OF THE INVENTION

It is, therefore, an object of this invention to obviate the disadvantages of the prior art.

It is another object of the invention to enhance fiber optic connectors.

Yet another object of the invention is the provision of an optical fiber connector which maintains functional integrity at temperature extremes.

These objects are accomplished, in one aspect of the invention, by the provision of an optical fiber-lens connector assembly. The assembly comprises a lens body formed of a transparent material and a connector for joining the optical fiber to the lens body. The lens body includes a head end having a lens formed therein and a tail end of substantially cylindrical configuration having an axial cavity therein formed to receive an elastomeric fiber holder. A shoulder is formed intermediate the head end and tail end and projects radially outward from the lens body.

The connector comprises a generally tubular body having a longitudinal axis and an open end and a substantially closed end. The substantially closed end does contain an opening. The tubular body has a given internal diameter formed to fittingly receive the tail end of the lens body and is affixed thereto. A bushing is mounted within the tubular body and has a first portion with a diameter substantially matching the given diameter and a second portion having a diameter less than the given diameter. A longitudinal optical fiber receiving aperture is provided in the bushing. A spring is fitted between the first portion of the bushing and the substantially closed end of the tubular body.

The force supplied by the spring against the bushing, which has an optical fiber adhered therein, prevents fiber movement at the lens interface during temperature extremes even though growth of the lens body occurs.

BRIEF DESCRIPTION OF THE DRAWINGS

FIG. 1 is an exploded, perspective view of a lens-connector assembly; and

Figs. 2, 3, and 4 are elevational, sectional views illustrating a method of assembling the components of the lens-connector assembly.

DESCRIPTION OF THE PREFERRED EMBODIMENT

For a better understanding of the present invention, together with other and further objects, advantages and capabilities thereof, reference is made to the following disclosure and appended claims taken in conjunction with the above-described drawings.

Referring now to the drawings with greater particularity, there is shown in FIG. 1 an optical fiber lens-connector assembly 10 which comprises a lens body 12 and a connector 14. The lens body 12 is molded of optical quality plastic and can be of a design similar to, and molded from the materials employed with, that shown in U.S. Pat. No. 4,421,383.

Body 12 has a head end 16 which includes a recessed lens 18 formed therein, and a tail end 20 of substantially cylindrical configuration. The tail end 20 contains an axial cavity 22 (see FIGS. 2-4) which contains an elastomeric fiber holder 24, which can be similar in principle to the elastomeric splices described in U.S. Pat. Nos. 4,257,674 or 4,325,607. A shoulder 26 is provided intermediate the head end 16 and the tail end 20 and projects radially outward from the lens body 12.

The connector 14 comprises a generally tubular body 28 having a longitudinal axis and an open end 30 and a substantially closed end 32 containing an opening 34. The tubular body 28 has a given internal diameter formed to fittingly receive the tail end 20 of lens body 12.

A bushing 36 is fitted within tubular body 28 and has a first portion 38 having a diameter substantially matching the given internal diameter of tubular body 28, and a second portion 40 having a diameter less than the given diameter. A longitudinal, optical fiber receiving aperture 42 is provided through bushing 36.

A helical spring 44 is fitted between the first portion 38 and the closed end 32 of tubular body 28.

The assembly 10 is constructed by first feeding an optical fiber 46 through opening 34 in substantially closed end 32 of tubular body 28. The spring 44 is then threaded over fiber 46 and the fiber is threaded into and through the receiving aperture 42 in bushing 36 (FIG. 2).

The end 48 of optical fiber 46 is then seated against a functional surface 50 (formed as a conical hole 52) in lens body 12, after the fiber has been inserted through an opening 54 in elastomeric fiber holder 24.

The lens body 12 and the bushing 36 are then positioned in axial alignment in a fixture 56, whereby the rearmost surface 58 of tail end 20 and the foremost surface 60 of bushing 36 are placed at a predetermined position as determined by spacer 61, which can be about 0.005" thick (See FIG. 3). An effective amount of an ultraviolet sensitive adhesive is placed on fiber 46 where it enters bushing 36. The amount of adhesive is small, just enough to achieve a bond between the fiber 46 and the bushing 36, and the adhesive is drawn around the fiber by capillary action. The adhesive is then exposed to ultraviolet radiation to solidify the bond and the lens body and bushing are removed from the fixture. The fiber 46 is now bonded to bushing 36 and the fiber 46 is maintained in its proper orientation with respect to lens body 12 by the frictional forces applied by the elastomeric fiber holder 24.

The spring 44 is then slid over second portion 40 and the tubular body 28 is then slid over the spring, bushing 36 and tail end 20 until the forward edge 62 contacts shoulder 26. The tubular body 28 is held in this position against the force of spring 44, either by hand or in a suitable fixture, and tubular body 28 is affixed to tail end 20, as by cement. A suitable cement is a cyanoacrylate adhesive.

The completed assembly 10 is shown in FIG. 4.

This assembly prevents fiber movement at the lens interface because of the spring load exerted against the bushing 36. Acrylic growth of the lens body may still occur during temperature excursions; however, the fiber-to-lens interface of the system remains constant While there have been shown and described what are at present considered to be the preferred embodiments of the invention, it will be apparent to those skilled in the art that various changes and modifications can be made without departing from the scope of the invention as defined by the appended claims.

We claim:

1. An optical fiber-lens connector assembly comprising: a lens body formed of transparent material, said lens body including a head end having a lens formed therein, a functional surface opposite said lens for receiving a fiber end, a tail end adjacent said functional surface of substantially cylindrical configuration having an axial cavity therein formed to receive an elastomeric fiber holder, and a shoulder formed intermediate said head end and said tail end and projecting radially outward from said lens body; and a connector for joining said optical fiber to said lens body, said connector comprising a generally tubular body having a longitudinal axis and an open end and a substantially closed end, said substantially closed end containing an opening, said tubular body having a given internal diameter formed to fittingly receive said tail end of said lens body and being affixed thereto; a bushing within said tubular body, said bushing having a first portion with a diameter substantially matching said given internal diameter and a second portion having a diameter less than said given diameter and a longitudinal, optical fiber receiving aperture therethrough formed to fixedly grip an optical fiber to prevent relative movement between the fiber and said bushing; and a spring fitted between said first portion of said bushing and said substantially closed end of said tubular body whereby fiber movement at said functional surface is prevented.

2. The assembly of claim 1 wherein said spring is a helical spring.

3. In a method of making the assembly of claim 2, the steps comprising: feeding an optical fiber through said opening in said substantially closed end of said tubular body; feeding said helical spring over said optical fiber; inserting said optical fiber through said receiving aperture in said bushing; seating the end of said optical fiber against a functional surface of said lens body after feeding said optical fiber through an aperture in an elastomeric fiber holder positioned in said axial cavity in said tail end; positioning said lens body and said bushing in axial alignment in a fixture whereby the rearmost surface of said tail end and the foremost surface of said bushing are in a predetermined position; placing an effective amount of an ultraviolet sensitive adhesive to secure a bond on said optical fiber where it enters said bushing, whereby said adhesive drawn around said fiber by capillary action; exposing said adhesive to ultraviolet light to solidify a bond between said fiber and said bushing; removing said lens body and said bushing from said fixture; sliding said spring over said second portion of said bushing; sliding said tubular body over said spring, said bushing, and said tail end until a forward edge of said tubular body contacts said shoulder on said lens body; and fixing said tubular body to said tail end while said contact is maintained.

* * * * *

UNITED STATES PATENT AND TRADEMARK OFFICE
CERTIFICATE OF CORRECTION

PATENT NO. : 4,770,488
DATED : Sept. 13, 1988
INVENTOR(S) : Jeffrey B. Shank, et al.

It is certified that error appears in the above—identified patent and that said Letters Patent is hereby corrected as shown below:

Cover page, Item No. 73;

"GTE Service Corporation" should read
--GTE Products Corporation--.

Signed and Sealed this

Twelfth Day of December, 1989

Attest:

JEFFREY M. SAMUELS

*Attesting Officer*   *Acting Commissioner of Patents and Trademarks*